(12) United States Patent
Jin et al.

(10) Patent No.: US 11,641,153 B2
(45) Date of Patent: May 2, 2023

(54) POWER CONVERSION MODULE

(71) Applicant: Delta Electronics, Inc., Taoyuan (TW)

(72) Inventors: Da Jin, Taoyuan (TW); Zhengyu Ye, Taoyuan (TW); Xueliang Chang, Taoyuan (TW); Shengli Lu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 67 days.

(21) Appl. No.: 17/358,203

(22) Filed: Jun. 25, 2021

(65) Prior Publication Data

US 2022/0006372 A1 Jan. 6, 2022

(30) Foreign Application Priority Data

Jul. 6, 2020 (CN) .......................... 202010640420.1

(51) Int. Cl.
*H02M 1/08* (2006.01)
*H02M 1/00* (2006.01)
*H02M 5/293* (2006.01)

(52) U.S. Cl.
CPC ......... *H02M 1/0048* (2021.05); *H02M 5/293* (2013.01)

(58) Field of Classification Search
CPC ...... H02M 1/0048; H02M 5/293; H02M 1/08; H02M 1/14; H02M 1/088; H02M 3/06; H02M 3/33576; H01F 27/24; H01F 27/28
See application file for complete search history.

(56) References Cited

U.S. PATENT DOCUMENTS

| 11,088,611 | B2* | 8/2021 | Jin | ............................ H01F 3/14 |
| 11,329,569 | B2* | 5/2022 | Jin | .................... H02M 3/33569 |
| 11,469,674 | B2* | 10/2022 | Jin | ......................... H02M 3/01 |
| 2020/0153335 | A1* | 5/2020 | Na | ...................... H02M 1/0043 |

FOREIGN PATENT DOCUMENTS

| CN | 207691701 U | 8/2018 |
| CN | 105934876 B | 4/2019 |
| CN | 107437885 B | 2/2020 |
| CN | 109565240 B | 2/2021 |
| JP | H1140425 A | 2/1999 |

* cited by examiner

*Primary Examiner* — Adolf D Berhane
(74) *Attorney, Agent, or Firm* — Kirton McConkie; Evan R. Witt

(57) ABSTRACT

A power conversion module includes a high-voltage side, a low-voltage side, a magnetic element, a high-voltage side circuit, and a low-voltage side circuit. The first end includes a high-voltage positive terminal and a high-voltage negative terminal. The second end includes a low-voltage positive terminal and a low-voltage negative terminal. The magnetic element includes two first windings. The high-voltage side circuit is electrically connected with the high-voltage positive terminal and the high-voltage negative terminal. The low-voltage side circuit is electrically connected with the low-voltage positive terminal and the low-voltage negative terminal. At least one AC loop includes at least one of the first windings, at least one part of the high-voltage side circuit and the low-voltage side circuit. The high-voltage side circuit and the low-voltage side circuit are located at a same side with respect to the magnetic element.

17 Claims, 14 Drawing Sheets

1A

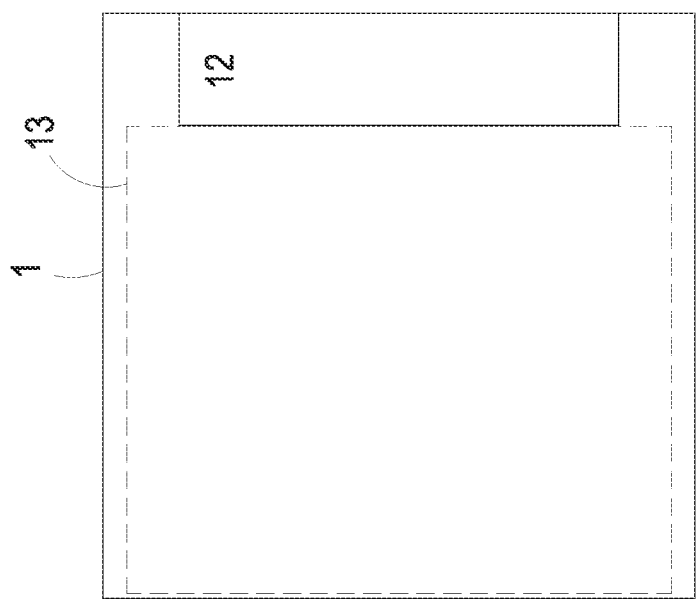

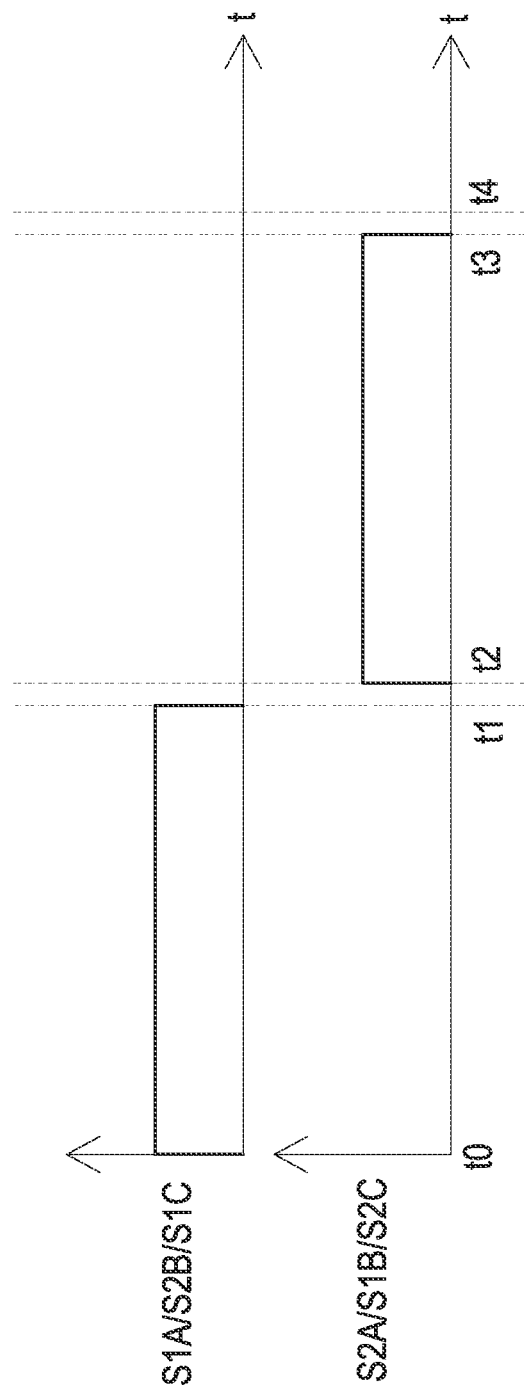

POWER CONVERSION MODULE

FIELD OF THE INVENTION

The present disclosure relates to a power conversion module, and more particularly to a power conversion module with a reduced AC current path length and reduced AC loss.

BACKGROUND OF THE INVENTION

With the improvement of the Internet technologies, the cloud computing technologies, the electric vehicle technologies, the industrial automation technologies and associated technologies, the amount of power consumption is largely increased and the demands on power sources are gradually increased. Accordingly, the power conversion module is developed toward high power density and high efficiency. Therefore, it is important to reduce the power loss of the power conversion module.

The power conversion module usually includes a magnetic element. For example, the magnetic element is a transformer or a coupling inductor. The power conversion module is an isolated power conversion module or a non-isolated power conversion module. The circuit components in the module are divided into a high-voltage side circuit group and a low-voltage side circuit group through the magnetic element. The high-voltage side circuit group includes at least one AC loop that is formed by the circuit components of the high-voltage side circuit group. The low-voltage side circuit group includes at least one AC loop that is formed by the circuit elements of the low-voltage side circuit group.

In the layout structure of the isolated power conversion module, the high-voltage side circuit group and the low-voltage side circuit group are usually distributed on two opposite sides of the magnetic element. Consequently, the AC loop of the high-voltage side circuit group and the AC loop of the low-voltage side circuit group will not be interfered with each other. Since the path length of the AC loop of the high-voltage side circuit group and the path length of the AC loop of the low-voltage side circuit group are the shortest, the parasitic inductance of the AC loop is effectively reduced and the efficiency of the power conversion module is increased.

Similarly, the non-isolated power conversion module is divided into the high-voltage side circuit group and the low-voltage side circuit group through the magnetic element. However, the non-isolated power conversion module includes plural AC loops. Each AC loop is usually defined by at least some circuit components of the high-voltage side circuit group and at least some circuit components of the low-voltage side circuit group. That is, each AC loop flows through the high-voltage side circuit group and the low-voltage side circuit group. If the layout structure of the non-isolated power conversion module is identical to the layout structure of the isolated power conversion module, some drawbacks occur. In case that the magnetic element is located at a middle region of the non-isolated power conversion module, the paths of the plural AC currents of the high-voltage side circuit group and the low-voltage side circuit group may be distributed on the two opposite sides of the magnetic element. Since the path lengths of the AC loops are too long, the AC loss of the non-isolated power conversion module increases.

Therefore, there is a need of providing an improved power conversion module in order to overcome the drawbacks of the conventional technologies.

SUMMARY OF THE INVENTION

An object of the present disclosure provides a power conversion module with reduced AC loop path lengths and reduced AC lower loss.

In accordance with an embodiment of the present disclosure, a power conversion module is provided. The power conversion module includes a first end, a second end, a magnetic element, a high-voltage side circuit, and a low-voltage side circuit. The first end includes a high-voltage positive terminal and a high-voltage negative terminal. The second end includes a low-voltage positive terminal and a low-voltage negative terminal. The low-voltage negative terminal is electrically connected with the high-voltage negative terminal. The magnetic element includes two first windings. The high-voltage side circuit is electrically connected with the high-voltage positive terminal and the high-voltage negative terminal, and electrically connected with the two first windings of the magnetic element. The low-voltage side circuit is electrically connected with the low-voltage positive terminal and the low-voltage negative terminal, and electrically connected with the two first windings of the magnetic element. The power conversion module includes at least one AC loop. In one embodiment, the at least one alternating current (AC) loop is defined by at least one of the first windings, at least one part of the high-voltage side circuit, and at least one part of the low-voltage side circuit. The at least one AC loop is adapted to flow through at least one of the first windings and flow through the high-voltage side circuit and the low-voltage side circuit. The high-voltage side circuit and the low-voltage side circuit are located at a same side with respect to the magnetic element.

The above contents of the present disclosure will become more readily apparent to those ordinarily skilled in the art after reviewing the following detailed description and accompanying drawings, in which:

BRIEF DESCRIPTION OF THE DRAWINGS

FIG. 1 schematically illustrates a layout structure of a power conversion module according to a first embodiment of the present disclosure;

FIG. 2B is a schematic timing waveform diagram illustrating the time sequence of operating associated switches of the power conversion circuit as shown in FIG. 2A;

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 2A:
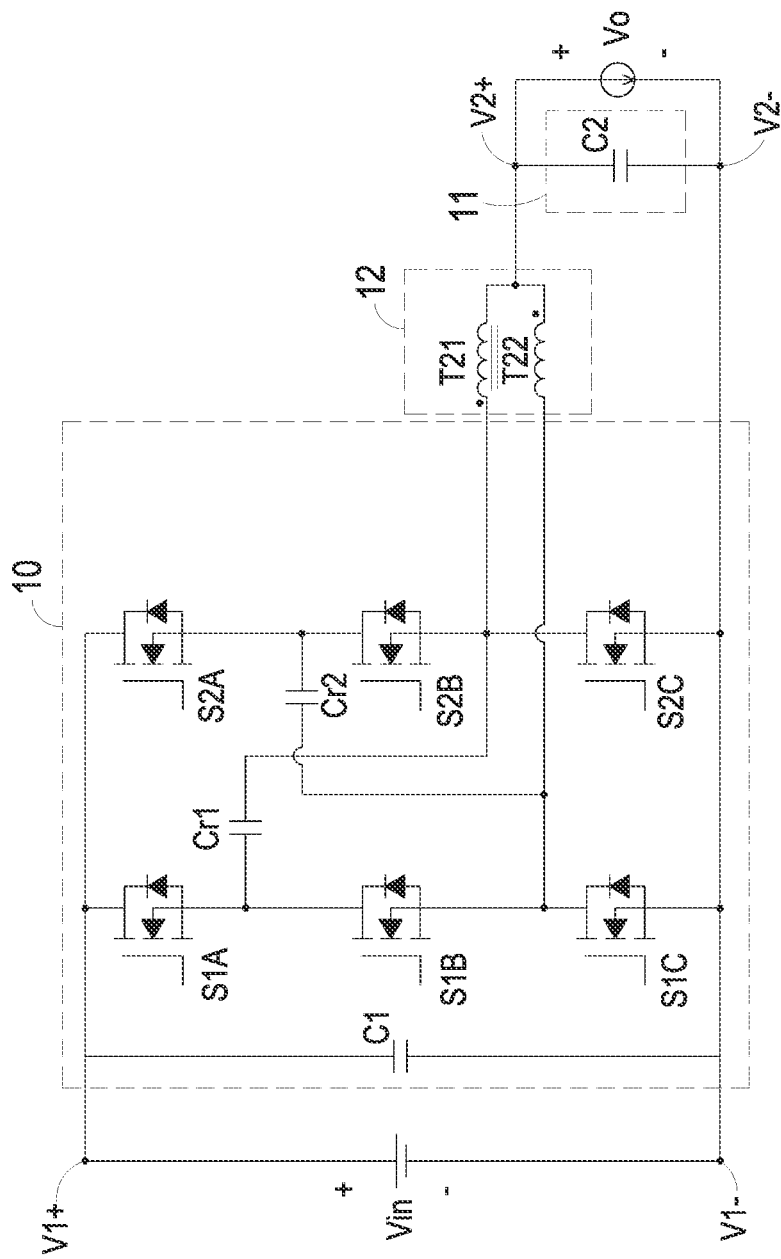
FIG. 2A is a schematic circuit diagram illustrating a first exemplary power conversion circuit of an embodiment of the present disclosure.
Figure 2C:
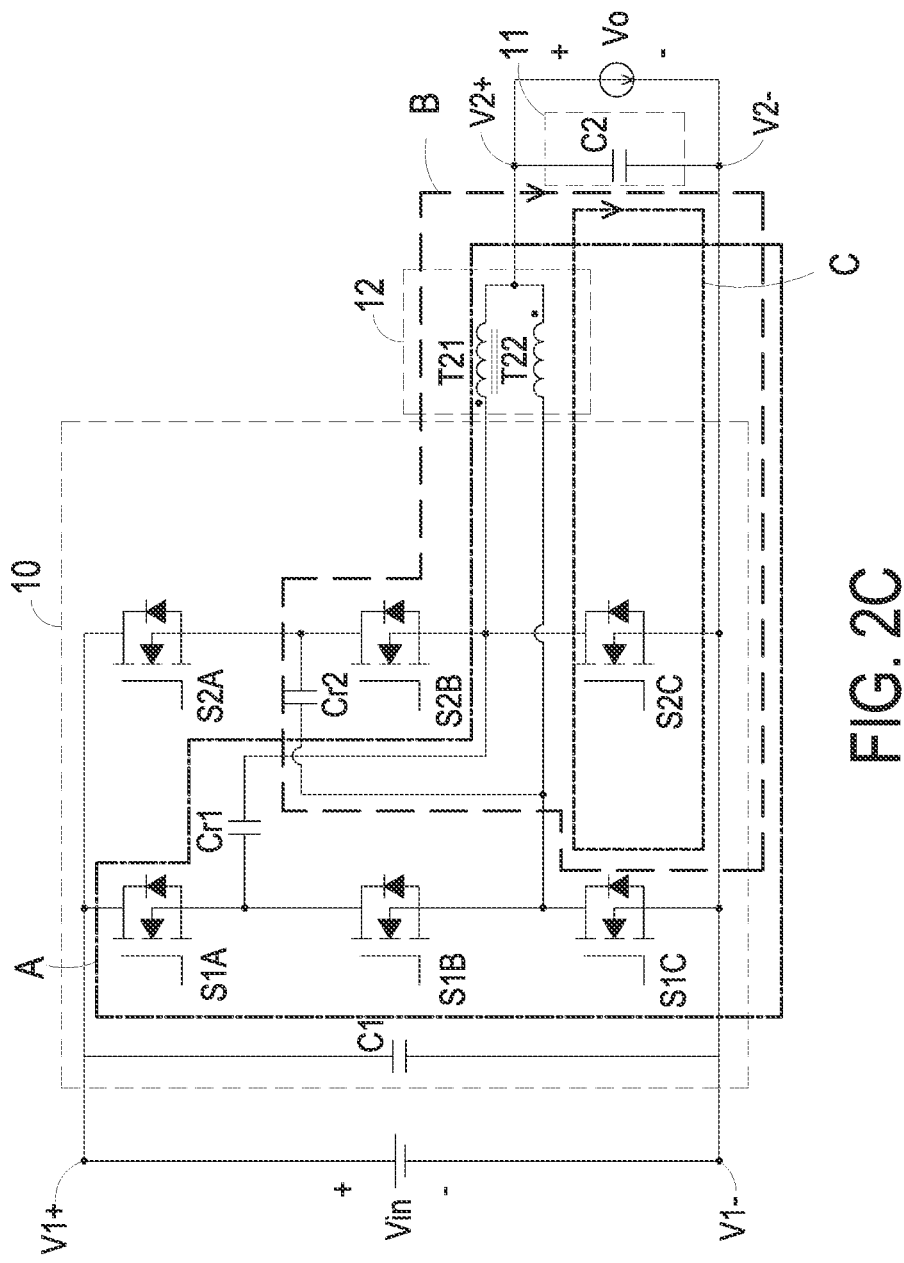
FIG. 2C is a schematic circuit diagram illustrating the AC loops of the power conversion circuit as shown in FIG. 2B in the time interval between the time point t0 and the time point t1.

FIG. 1 schematically illustrates a layout structure of a power conversion module according to a first embodiment of the present disclosure. FIG. 2A is a schematic circuit diagram illustrating a first exemplary power conversion circuit of an embodiment of the present disclosure. FIG. 2B is a schematic timing waveform diagram illustrating the time sequence of operating associated switches of the power conversion circuit as shown in FIG. 2A. FIG. 2C is a schematic circuit diagram illustrating the AC loops of the power conversion circuit as shown in FIG. 2B in the time interval between the time point t0 and the time point t1. The power conversion circuit as shown in FIG. 2A can be applied to the power conversion module as shown in FIG. 1.

In the embodiment, the power conversion module 1 is a non-isolated power conversion module. The non-isolated power conversion module has a resonant and duty-cycle-expandable circuit topology. In the embodiment as shown in FIG. 2A, the power conversion circuit of the power conversion module 1 has a symmetric circuitry structure.

A power conversion circuit 1A of the power conversion module 1 includes a first end, a second end, a high-voltage side circuit 10, a low-voltage side circuit 11, and a magnetic element 12. The first end includes a high-voltage positive terminal V1+ and a high-voltage negative terminal V1−. The power conversion circuit 1A receives an input voltage Vin through the high-voltage positive terminal V1+ and the high-voltage negative terminal V1−. The second end includes a low-voltage positive terminal V2+ and a low-voltage negative terminal V2−. In an embodiment, the power conversion circuit 1A is adapted to receive the input voltage Vin through the first end and generate an output voltage Vo through the second end. The power conversion circuit 1A is adapted to convert a high voltage at the first end and a low voltage at the second end. The low-voltage negative terminal V2− is further electrically connected with the high-voltage negative terminal V1−. Consequently, the power conversion circuit 1A of the power conversion module 1 has the non-isolated circuitry structure. The magnetic element 12 includes a transformer. In an embodiment, the magnetic element 12 includes two first windings T21 and T22, which are magnetically coupled with each other.

The high-voltage side circuit 10 is electrically connected with the high-voltage positive terminal V1+ and the high-voltage negative terminal V1−, and electrically connected with the first terminals of the two first windings T21 and T22 of the magnetic element 12. The low-voltage side circuit 11 is electrically connected with the low-voltage positive terminal V2+ and the low-voltage negative terminal V2−, and electrically connected with the second terminals of the two first windings T21 and T22 of the magnetic element 12. The second terminals of the two first windings T21 and T22 of the magnetic element 12 are opposite-polarity terminals. Moreover, the two first windings T21 and T22 of the magnetic element 12 are electrically connected with the low-voltage positive terminal V2+.

In an embodiment, the high-voltage side circuit 10 includes a high-voltage side capacitor C1, a first flying capacitor Cr1, a second flying capacitor Cr2, a first switch group, and a second switch group. A first terminal of the high-voltage side capacitor C1 is electrically connected with the high-voltage positive terminal V1+ in the high-voltage side. A second terminal of the high-voltage side capacitor C1 is electrically connected with the high-voltage negative terminal V1− in the high-voltage side. The high-voltage side capacitor C1 may filter off the voltage ripple in the high-voltage side.

The first switch group includes a first switch S1A, a second switch S2B, and a third switch S2C. The second switch group includes a fourth switch S2A, a fifth switch S1B, and a sixth switch S1C. A first terminal of the first switch S1A is electrically connected with the high-voltage positive terminal V1+. A second terminal of the first switch S1A is electrically connected with a first terminal of the fifth switch S1B. A second terminal of the fifth switch S1B is electrically connected with a first terminal of the sixth switch S1C. A second terminal of the sixth switch S1C is electrically connected with the high-voltage negative terminal V1−. A first terminal of the fourth switch S2A is electrically connected with the high-voltage positive terminal V1+ and the first terminal of the first switch S1A. A second terminal of the fourth switch S2A is electrically connected with a first terminal of the second switch S2B. A second terminal of the second switch S2B is electrically connected with a first terminal of the third switch S2C. A second terminal of the third switch S2C is electrically connected with the high-voltage negative terminal V1−. A first terminal of the first flying capacitor Cr1 is electrically connected with the second terminal of the first switch S1A. A second terminal of the first flying capacitor Cr1 is electrically connected with the second terminal of the second switch S2B and the first terminal of the third switch S2C. A first terminal of the second flying capacitor Cr2 is electrically connected with the second terminal of the fourth switch S2A. A second terminal of the second flying capacitor Cr2 is electrically connected with the second terminal of the fifth switch SlB and the first terminal of the sixth switch S1C. Moreover, the first switch S1A, the second switch S2B, the third switch S2C, the fourth switch S2A, the fifth switch SlB, and the sixth switch S1C are periodically operated in a switching cycle.

The low-voltage side circuit 11 includes a low-voltage side capacitor C2. A first terminal of the low-voltage side capacitor C2 is electrically connected with the low-voltage positive terminal V2+ in the low-voltage side. A second terminal of the low-voltage side capacitor C2 is electrically connected with the low-voltage negative terminal V2− in the low-voltage side. The low-voltage side capacitor C2 may filter off the voltage ripple in the low-voltage side.

The on/off states of the first switch S1A, the second switch S2B, and the sixth switch S1C are identical. The on/off states of the fourth switch S2A, the fifth switch S1B, and the third switch S2C are identical. As shown in FIG. 2B, the time interval between the time point t0 and the time point t4 is equal to one switching cycle. In the time interval between the time point t0 and the time point t1, the first switch S1A, the second switch S2B, and the sixth switch S1C are in the on state. In the time interval between the time point t2 and the time point t3, the fourth switch S2A, the fifth switch S1B, and the third switch S2C are in the on state. The time interval between the time point t1 and the time point t2 is a dead time. The time interval between the time point t3 and the time point t4 is also a dead time. The phase difference between the control signals for controlling the first switch S1A and the fourth switch S2A is 180 degrees. If the dead time is not taken into consideration, the duty cycle of each switch is about 50%.

In the time interval between the time point t0 and the time point t1 or the time interval between the time point t2 and the time point t3, the power conversion module 1 has three AC loops.

The AC loops of the power conversion module in the time interval between the time point t0 and the time point t1 can be seen in FIG. 2C. Since the first switch S1A, the second switch S2B, and the sixth switch S1C are in the on state, the power conversion circuit 1A of the power conversion module 1 has three AC loops. The first AC loop A is defined by the high-voltage side capacitor C1, the first switch S1A, the first flying capacitor Cr1, the first winding T21, and the low-voltage side capacitor C2 collaboratively. The second AC loop B is defined by the sixth switch S1C, the second flying capacitor Cr2, the second switch S2B, the first winding T21, and the low-voltage side capacitor C2 collaboratively. The third AC loop C is defined by the sixth switch S1C, the first winding T22, and the low-voltage side capacitor C2 collaboratively. In other words, in the time interval between the time point t0 and the time point t1, the power conversion circuit 1A has three AC loops. The AC current flowing through the first winding T21 flows through both of the high-voltage side circuit 10 and the low-voltage side circuit 11, and the AC current flowing through the first winding T22 flows through both of the high-voltage side circuit 10 and the low-voltage side circuit 11.

In the time interval between the time point t2 and the time point t3, the fourth switch S2A, the fifth switch S1B, and the third switch S2C are in the on state. Similarly, the power conversion module 1 has three AC loops. The first AC loop is defined by the high-voltage side capacitor C1, the fourth switch S2A, the second flying capacitor Cr2, the first winding T22, and the low-voltage side capacitor C2 collaboratively. The second AC loop is defined by the third switch S2C, the first flying capacitor Cr1, the fifth switch S1B, the first winding T22, and the low-voltage side capacitor C2 collaboratively. The third AC loop is defined by the third switch S2C, the first winding T21 and the low-voltage side capacitor C2 collaboratively. In other words, in the time interval between the time point t2 and the time point t3, the power conversion circuit 1A has three AC loops. The AC current flowing through the first winding T22 flows through both of the high-voltage side circuit 10 and the low-voltage side circuit 11, and the AC current flowing through the first winding T21 flows through both of the high-voltage side circuit 10 and the low-voltage side circuit 11.

As mentioned above, the current flowing through any first winding flows through both of the high-voltage side circuit 10 and the low-voltage side circuit 11. In the layout structure of FIG. 1, the high-voltage side circuit 10 and the low-voltage side circuit 11 are located at the same side with respect to the magnetic element 12. That is, both of the high-voltage side circuit 10 and the low-voltage side circuit 11 are included in the same region 13. Consequently, the plural AC loops (i.e., the first AC loop, the second AC loop, and the third AC loop in the time interval between the time point t0 and the time point t1, or the first AC loop, the second AC loop, and the third AC loop in the time interval between the time point t2 and the time point t3) flowing through the high-voltage side circuit 10 and the low-voltage side circuit 11 are located at the same side with respect to the magnetic element 12. Since the plural AC loops are not located at the two opposite sides of the magnetic element 12, the path length of each AC loop is reduced, and the AC loss of the power conversion circuit 1A is decreased. Moreover, since the high-voltage side circuit 10 and the low-voltage side circuit 11 are located at the same side with respect to the magnetic element 12, the high-voltage side circuit 10 and the low-voltage side circuit 11 are included in the same side of the power conversion module 1. Since the electronic components are closely arranged, the size of the power conversion module 1 is reduced.

Figure 3:
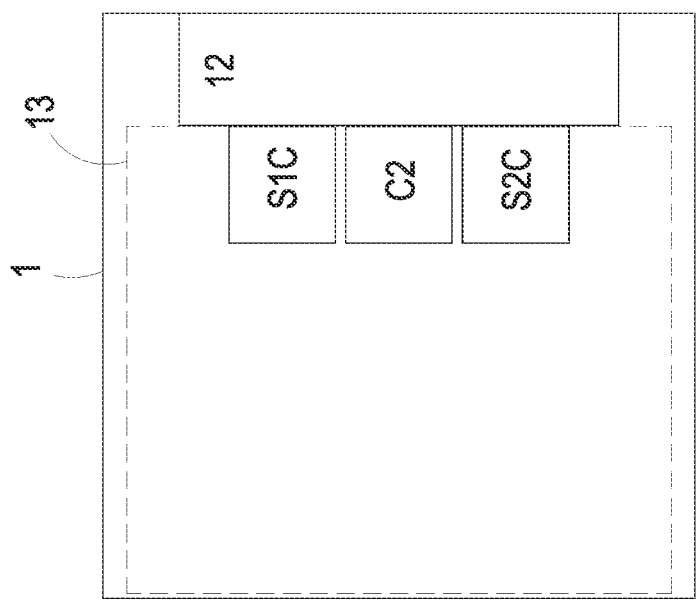
FIG. 3 schematically illustrates a layout structure of a power conversion module according to a second embodiment of the present disclosure.

FIG. 3 schematically illustrates a layout structure of a power conversion module according to a second embodiment of the present disclosure. The circuit diagram as shown in FIG. 2B and the time sequence of operating associated switches as shown in FIG. 2C can be applied to the layout structure of this embodiment. In the time interval between the time point t0 and the time point t1, the power conversion module 1 has three AC loops. The AC current flowing through the third AC loop is equal to the sum of the AC current flowing through the first AC loop and the AC current flowing through the second AC loop. In this embodiment, the third AC loop has the smallest path length, and thus the circumscribed area of the third AC loop is reduced. Consequently, the AC loss is effectively reduced. As mentioned above, the third AC loop C is defined by the sixth switch S1C, the first winding T22 and the low-voltage side capacitor C2 collaboratively. In this embodiment, at least one of the sixth switch S1C, the third switch S2C, and the low-voltage side capacitor C2 is placed as close to the magnetic element 12 as possible. That is, at least one of the sixth switch S1C, the third switch S2C, and the low-voltage side capacitor C2 is located adjacent to one side of the magnetic element 12 and closer to the magnetic element 12 than any other component of the high-voltage side circuit 10 and the low-voltage side circuit 11. Consequently, the third AC loop has the smallest path length. In an embodiment, the sixth switch S1C, the third switch S2C, and the low-voltage side capacitor C2 are located adjacent to the magnetic element 12 and sequentially arranged in a first row. That is, the sixth switch S1C, the third switch S2C, and the low-voltage side capacitor C2 are closer to the magnetic element 12 than any other component of the high-voltage side circuit 10 and the low-voltage side circuit 11. Consequently, the third AC loop has the smallest path length.

Figure 4A:
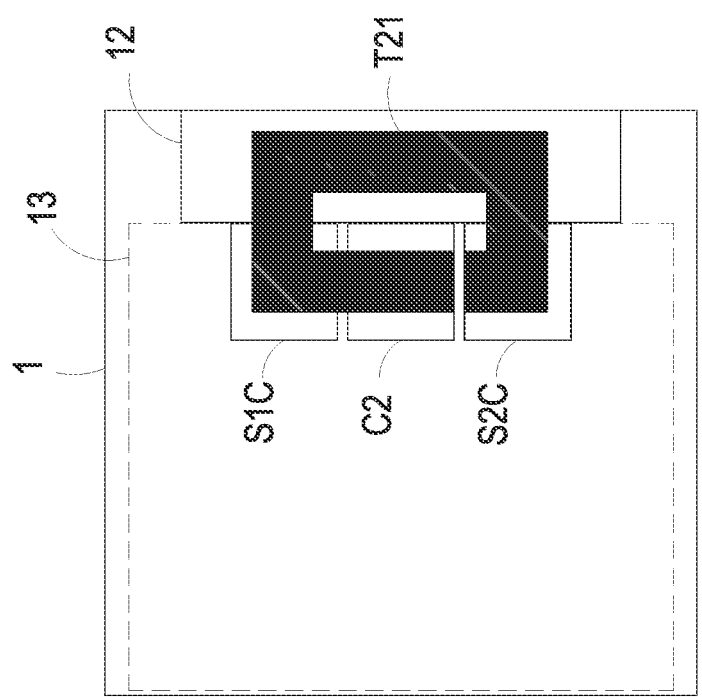
FIGS. 4A and 4B schematically illustrates a layout structure of a power conversion module according to a third embodiment of the present disclosure, in which the two windings are shown.
Figure 4B:
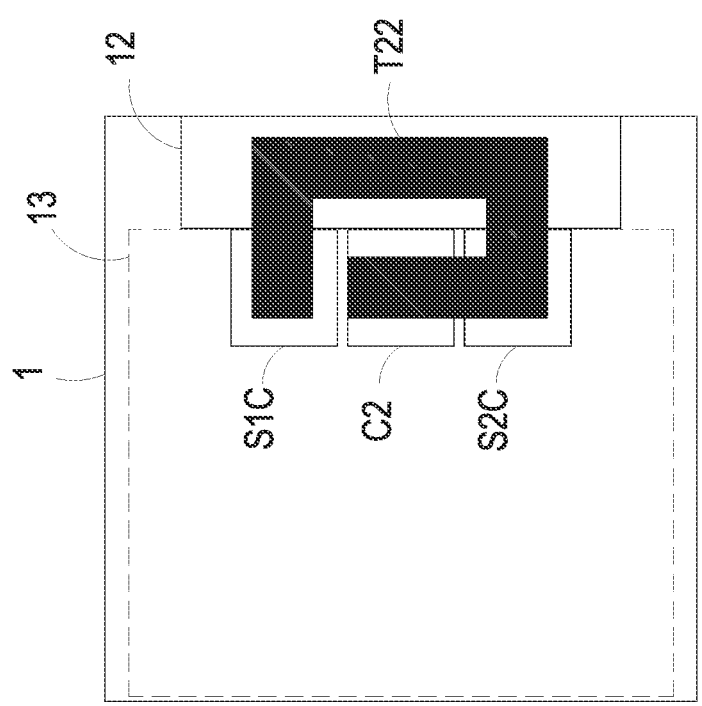

Please refer to FIGS. 4A and 4B. FIGS. 4A and 4B schematically illustrates a layout structure of a power conversion module according to a third embodiment of the present disclosure, in which the two windings are shown. In this embodiment, the two first windings T21 and T21 are planar windings that are mounted on a printed circuit board (not shown). As shown in FIG. 4A, the second terminal of the first winding T21 is electrically connected with the first terminal of the low-voltage side capacitor C2, and the first terminal of the first winding T21 is electrically connected with the first terminal of the third switch S2C. Moreover, a projection area of the third switch S2C with respect to the first winding T21 is partially overlapped with the first winding T21. As shown in FIG. 4B, the second terminal of the first winding T22 is electrically connected with the first terminal of the low-voltage side capacitor C2, and the first terminal of the first winding T22 is electrically connected with the first terminal of the sixth switch S1C. Moreover, a projection area of the sixth switch S1C with respect to the first winding T22 is partially overlapped with the first winding T22. Consequently, the path length of the third AC loop is reduced, and the AC loss of the power conversion module 1 is reduced. More preferably, the projection overlap between the first winding T21 and the first winding T22 with respect to the horizontal plane is very high (e.g., larger than 80%). Consequently, the coupling coefficient of the magnetic element 12 is increased.

Figure 5:
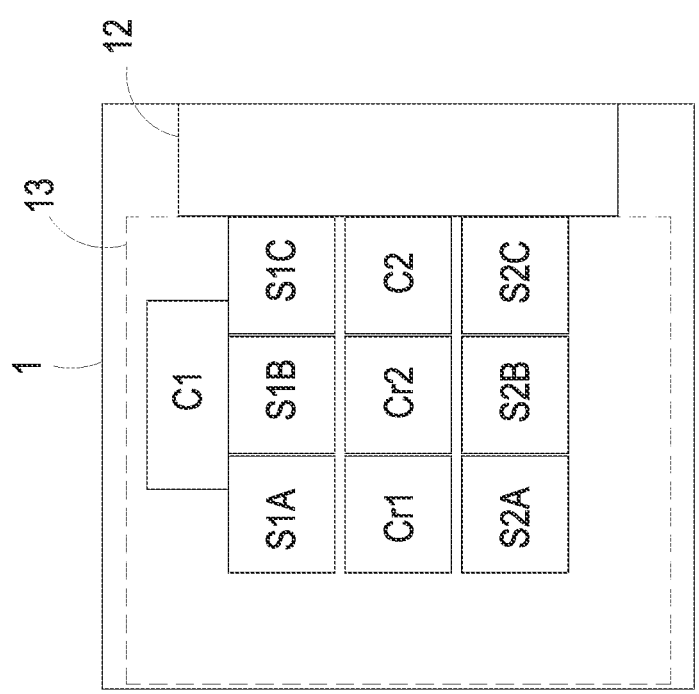
FIG. 5 schematically illustrates a layout structure of a power conversion module according to a fourth embodiment of the present disclosure.

FIG. 5 schematically illustrates a layout structure of a power conversion module according to a fourth embodiment of the present disclosure. Like the example of FIG. 3, the sixth switch S1C, the third switch S2C, and the low-voltage side capacitor C2 of the first AC loop are located adjacent to the magnetic element 12 and sequentially arranged in a first row. The fifth switch S1B, the second flying capacitor Cr2, and the second switch S2B are sequentially arranged in a second row. The first switch S1A, the first flying capacitor Cr1, and the fourth switch S2A are sequentially arranged in a third row. The first row, the second row, and the third row are disposed along one direction. In one embodiment, the first row, the second row, and the third row are in parallel. The second row is arranged between the first row and the third row. Consequently, the path lengths of the first AC loop and the second AC loop are reduced, the circumscribed areas of the first AC loop and the second AC loop are reduced, and the AC loss of the power conversion module 1 is reduced. In an embodiment, the high-voltage side capacitor C1 is located beside the first end of the first row, the first end of the second row, and the first end of the third row. For example, the high-voltage side capacitor C1 is located beside the first switch S1A, the fifth switch S1B, and the sixth switch S1C. Alternatively, the high-voltage side capacitor C1 is located beside the second end of the first row, the second end of the second row, and the second end of the third row. For example, the high-voltage side capacitor C1 is located beside the fourth switch S2A, the second switch S2B, and the third switch S2C.

Figure 6:
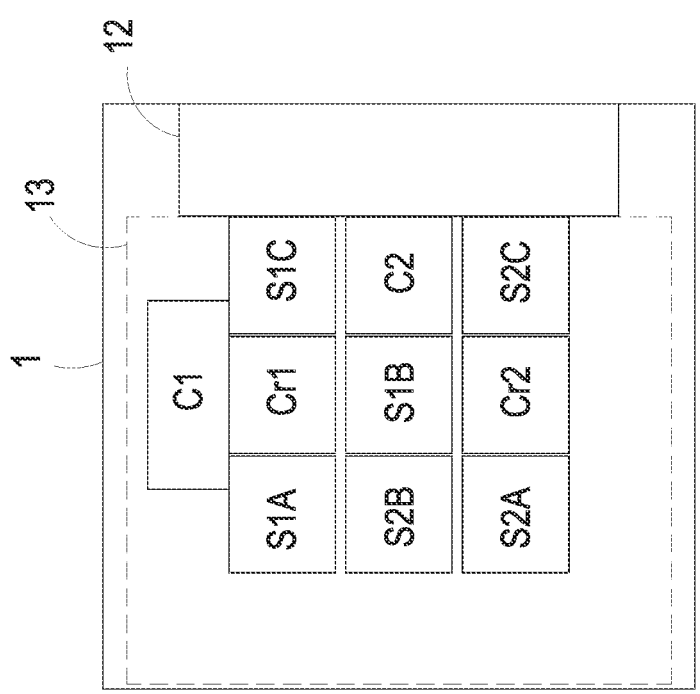
FIG. 6 schematically illustrates a layout structure of a power conversion module according to a fifth embodiment of the present disclosure.

FIG. 6 schematically illustrates a layout structure of a power conversion module according to a fifth embodiment of the present disclosure. Like the example of FIG. 3, the sixth switch S1C, the third switch S2C, and the low-voltage side capacitor C2 of the first AC loop are located adjacent to the magnetic element 12 and sequentially arranged in a first row. The first flying capacitor Cr1, the fifth switch S1B, and the second flying capacitor Cr2 are sequentially arranged in a second row. The first switch S1A, the second switch S2B, and the fourth switch S2A are sequentially arranged in a third row. The first row, the second row, and the third row are disposed along one direction. The second row is arranged between the first row and the third row. Consequently, the path lengths of the first AC loop and the second AC loop are reduced, the circumscribed areas of the first AC loop and the second AC loop are reduced, and the AC loss of the power conversion module 1 is reduced. In an embodiment, the high-voltage side capacitor C1 is located beside the first end of the first row, the first end of the second row and the first end of the third row. For example, the high-voltage side capacitor C1 is located beside the first switch S1A, the first flying capacitor Cr1, and the sixth switch S1C. Alternatively, the high-voltage side capacitor C1 is located beside the second end of the first row, the second end of the second row, and the second end of the third row. For example, the high-voltage side capacitor C1 is located beside the fourth switch S2A, the second flying capacitor Cr2 and the third switch S2C.

Figure 7:
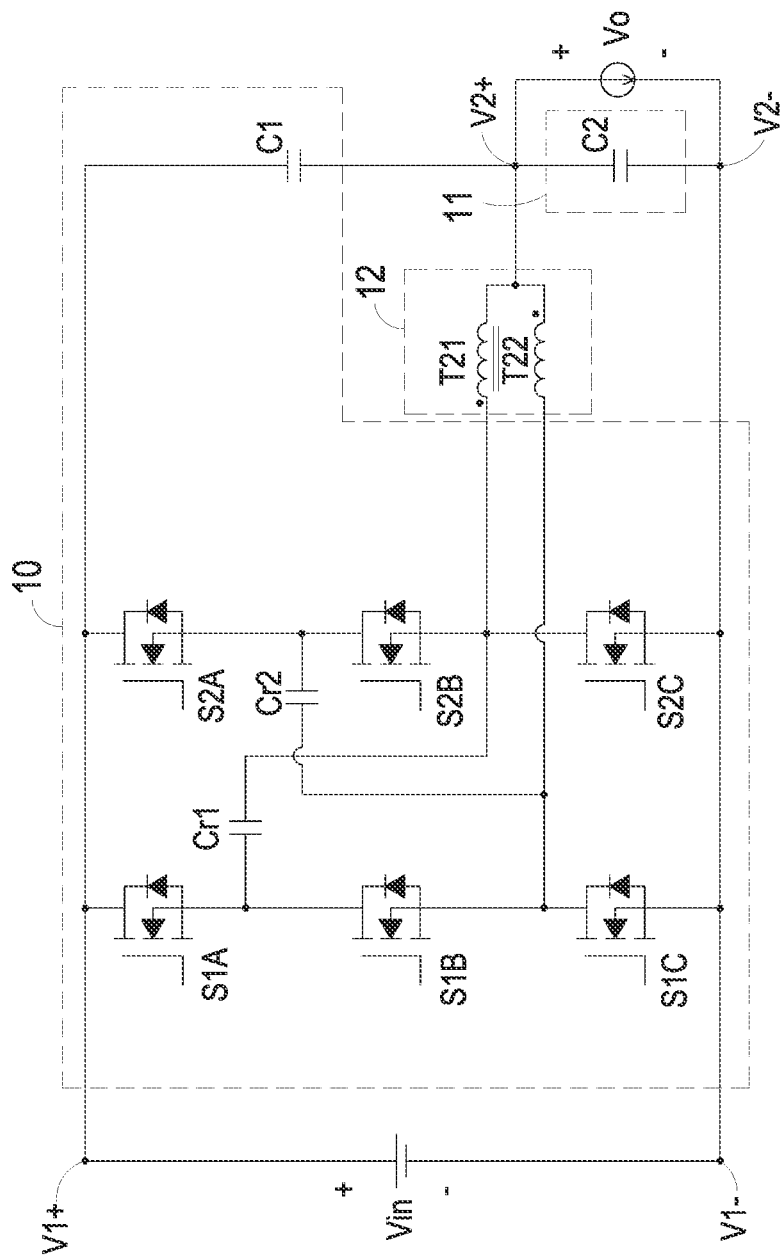
FIG. 7 is a schematic circuit diagram illustrating a second exemplary power conversion circuit of an embodiment of the present disclosure.

FIG. 7 is a schematic circuit diagram illustrating a second exemplary power conversion circuit of an embodiment of the present disclosure. In comparison with the power conversion circuit of FIG. 2A, the connecting relationships between the high-voltage side capacitor C1 and associated components of the power conversion circuit 1B of this embodiment are distinguished. In this embodiment, the second terminal of the high-voltage side capacitor C1 is electrically connected with the low-voltage positive terminal V2+ in the low-voltage side. The high-voltage side capacitor C1 and the low-voltage side capacitor C2 are connected with each other in series to filter off the voltage ripple in the high-voltage side. The method of controlling the switches of the power conversion circuit 1B are similar to the concept as shown in FIG. 2B.

Similarly, in the time interval between the time point t0 and the time point t1, the first switch S1A, the second switch S2B and the sixth switch S1C are in the on state. Consequently, the power conversion circuit 1B has three AC loops. The first AC loop is defined by the high-voltage side capacitor C1, the first switch S1A, the first flying capacitor Cr1, and the first winding T21 collaboratively. The second AC loop is defined by the sixth switch S1C, the second flying capacitor Cr2, the second switch S2B, the first winding T21, and the low-voltage side capacitor C2 collaboratively. The third AC loop C is defined by the sixth switch S1C, the first winding T22, and the low-voltage side capacitor C2 collaboratively. In the time interval between the time point t0 and the time point t1, the three AC loops flow through both of the high-voltage side circuit 10 and the low-voltage side circuit 11. That is, the AC current flowing through each first winding flows through both of the high-voltage side circuit 10 and the low-voltage side circuit 11.

In the time interval between the time point t2 and the time point t3, the fourth switch S2A, the fifth switch S1B and the third switch S2C are in the on state. Similarly, the power conversion circuit 1B has three AC loops. The first AC loop is defined by the high-voltage side capacitor C1, the fourth switch S2A, the second flying capacitor Cr2, and the first winding T22 collaboratively. The second AC loop is defined by the third switch S2C, the first flying capacitor Cr1, the fifth switch S1B, the first winding T22, and the low-voltage side capacitor C2 collaboratively. The third AC loop is defined by the third switch S2C, the first winding T21, and the low-voltage side capacitor C2 collaboratively. In the time interval between the time point t2 and the time point t3, the AC currents of the three AC loops flow through both of the high-voltage side circuit 10 and the low-voltage side circuit 11. That is, the AC current flowing through each first winding flows through both of the high-voltage side circuit 10 and the low-voltage side circuit 11.

The power conversion circuit 1B can be applied to the power conversion module with any of the above layout structures. Consequently, the AC loss of the power conversion circuit is decreased, and the size of the power conversion module is reduced.

Figure 8:
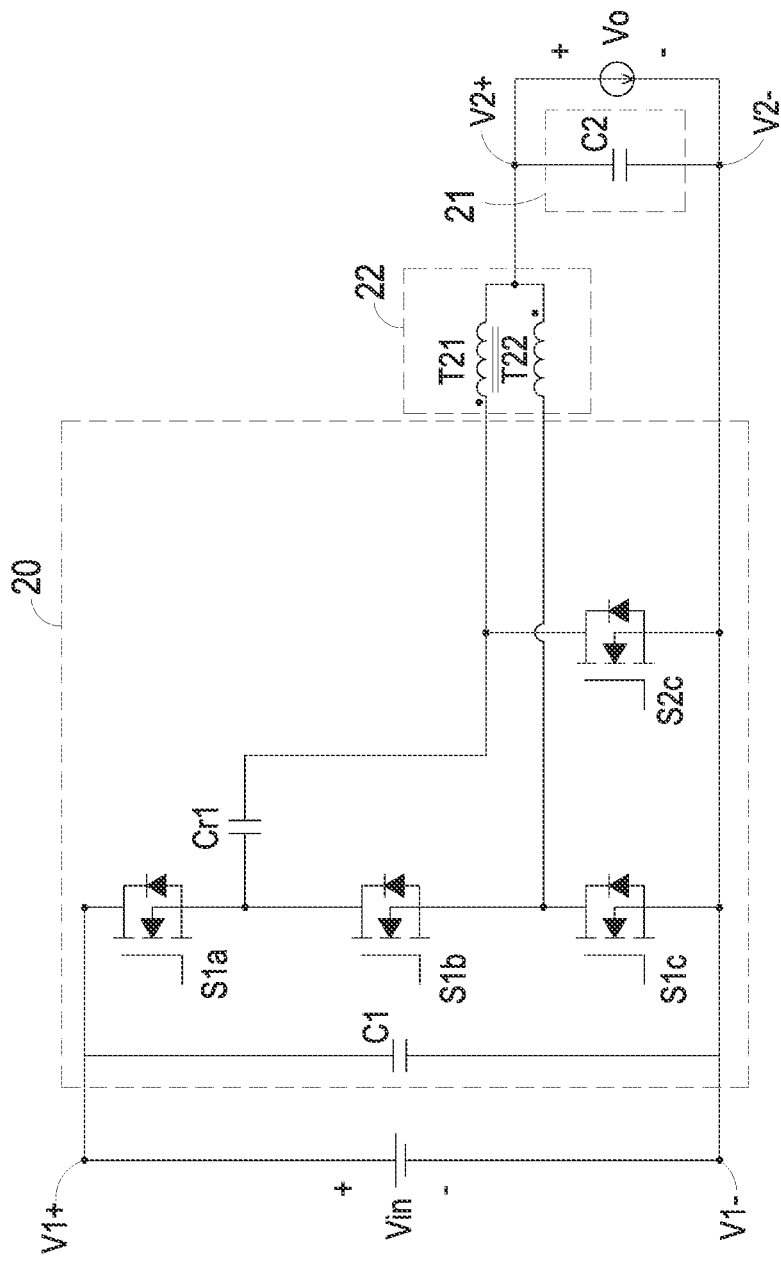
FIG. 8 is a schematic circuit diagram illustrating a third exemplary power conversion circuit of an embodiment of the present disclosure.

FIG. 8 is a schematic circuit diagram illustrating a third exemplary power conversion circuit of an embodiment of the present disclosure. In this embodiment, the power conversion circuit is a non-isolated power conversion circuit. The non-isolated power conversion module has a resonant and duty-cycle-expandable circuit topology. Moreover, the power conversion circuit of the power conversion module has an asymmetric circuitry structure.

As shown in FIG. 8, the power conversion circuit 1C includes a first end, a second end, a high-voltage side circuit 20, a low-voltage side circuit 21, and a magnetic element 22. The first end includes a high-voltage positive terminal V1+ and a high-voltage negative terminal V1−. The power conversion circuit 1C receives an input voltage Vin through the high-voltage positive terminal V1+ and the high-voltage negative terminal V1−. The second end includes a low-voltage positive terminal V2+ and a low-voltage negative terminal V2−. The power conversion circuit 1C generates an output voltage Vo through the low-voltage positive terminal V2+ and the low-voltage negative terminal V2−. The low-voltage negative terminal V2− is further electrically connected with the high-voltage negative terminal V1−. Consequently, the power conversion circuit 1C has the non-isolated circuitry structure. The magnetic element 22 is transformer. In an embodiment, the magnetic element 22 includes two first windings T21 and T22, which are magnetically coupled with each other.

The high-voltage side circuit 20 is electrically connected with the high-voltage positive terminal V1+ and the high-voltage negative terminal V1−, and electrically connected with the first terminals of the two first windings T21 and T22 of the magnetic element 22. The low-voltage side circuit 21 is electrically connected with the low-voltage positive terminal V2+ and the low-voltage negative terminal V2−, and electrically connected with the second terminals of the two first windings T21 and T22 of the magnetic element 22. The second terminals of the two first windings T21 and T22 of the magnetic element 22 are opposite-polarity terminals. Moreover, the two first windings T21 and T22 of the magnetic element 12 are electrically connected with the low-voltage positive terminal V2+ of the power conversion circuit 1C.

In an embodiment, the high-voltage side circuit 20 includes a high-voltage side capacitor C1, a first flying capacitor Cr1, a first switch group, and a second switch group. A first terminal of the high-voltage side capacitor C1 is electrically connected with the high-voltage positive terminal V1+ in the high-voltage side. A second terminal of the high-voltage side capacitor C1 is electrically connected with the high-voltage negative terminal V1− in the high-voltage side. The high-voltage side capacitor C1 is used for filtering off the voltage ripple in the high-voltage side.

The first switch group includes a first switch S1a and a third switch S2c. The second switch group includes a second switch S1b and a fourth switch S2c. Moreover, the first switch S1a, the second switch S1b, the third switch S2c, and the fourth switch S1c are periodically operated in a switching cycle. A first terminal of the first switch S1a is electrically connected with the high-voltage positive terminal V1+. A second terminal of the first switch S1a is electrically connected with a first terminal of the second switch S1b. A second terminal of the second switch S1b is electrically connected with a first terminal of the fourth switch S1c. A second terminal of the third switch S2c and a second terminal of the fourth switch S1c are electrically connected with each other and electrically connected with the high-voltage negative terminal V1−. The on/off states of the first switch S1a and the fourth switch S1c are identical. The on/off states of the second switch S1b and the third switch S2c are identical. The phase difference between the control signals for controlling the first switch S1a and the second switch S1b is 180 degrees. The time duration of the first switch S1a and the time duration of the second switch S1b are shorter than or equal to 0.5×Ts and larger than or equal to 0.4×Ts, wherein Ts is the switching cycle. A first terminal of the first flying capacitor Cr1 is electrically connected with the second terminal of the first switch S1a and the first terminal of the second switch S1b. A second terminal of the first flying capacitor Cr1 is electrically connected with the first terminal of the third switch S2c.

The low-voltage side circuit 21 includes a low-voltage side capacitor C2. A first terminal of the low-voltage side capacitor C2 is electrically connected with the low-voltage positive terminal V2+. A second terminal of the low-voltage side capacitor C2 is electrically connected with the low-voltage negative terminal V2−. The low-voltage side capacitor C2 is used for filtering off the voltage ripple in the low-voltage side.

When the first switch S1a and the fourth switch S1c are in the on state, the power conversion circuit 1C has two AC loops. The first AC loop is defined by the high-voltage side capacitor C1, the first switch S1a, the first flying capacitor Cr1, the first winding T21 and the low-voltage side capacitor C2 collaboratively. The second AC loop is defined by the fourth switch S1c, the first winding T22 and the low-voltage side capacitor C2 collaboratively. When the first switch S1a and the fourth switch S1c are in the on state, at least one AC loop flows through both of the high-voltage side circuit 20 and the low-voltage side circuit 21. That is, the AC current flowing through each first winding flows through both of the high-voltage side circuit 20 and the low-voltage side circuit 21.

When the second switch S1b and the third switch S2c are in the on state, the power conversion circuit 1C has two AC loops. The first AC loop is defined by the third switch S2c, the first flying capacitor Cr1, the second switch S1b, the first winding T22, and the low-voltage side capacitor C2 collaboratively. The second AC loop is defined by the third switch S2c, the first winding T21, and the low-voltage side capacitor C2 collaboratively. When the second switch S1b and the third switch S2c are in the on state, at least one AC loop includes at least one part of the high-voltage side circuit 20 and the low-voltage side circuit 21. That is, the AC current flowing through each first winding flows through both of the high-voltage side circuit 20 and the low-voltage side circuit 21.

The power conversion circuit 1C can be applied to the power conversion module with any of the above layout structures. Consequently, the AC loss of the power conversion circuit is decreased, and the size of the power conversion module is reduced.

Figure 9:
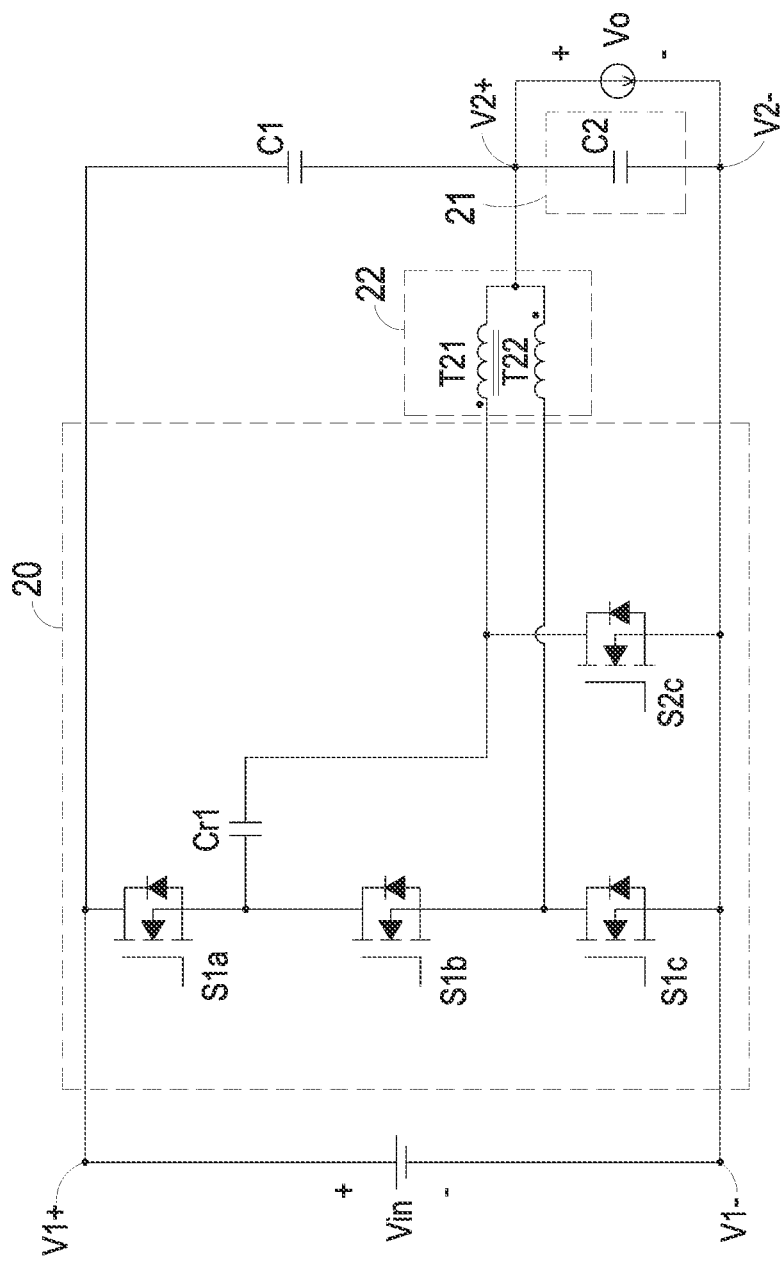
FIG. 9 is a schematic circuit diagram illustrating a fourth exemplary power conversion circuit of an embodiment of the present disclosure.

FIG. 9 is a schematic circuit diagram illustrating a fourth exemplary power conversion circuit of an embodiment of the present disclosure. In comparison with the power conversion circuit of FIG. 8, the connecting relationships between the high-voltage side capacitor C1 and associated components of the power conversion circuit 1D of this embodiment are distinguished. In this embodiment, the second terminal of the high-voltage side capacitor C1 is electrically connected with the low-voltage positive terminal V2+ in the low-voltage side. The high-voltage side capacitor C1 and the low-voltage side capacitor C2 are connected with each other in series to filter off the voltage ripple in the high-voltage side. The method of controlling the switches of the power conversion circuit 1D are similar to the concept as shown in FIG. 8.

When the first switch S1a and the fourth switch S1c are in the on state, the power conversion circuit 1D has two AC loops. The first AC loop is defined by the high-voltage side capacitor C1, the first switch S1a, the first flying capacitor Cr1, and the first winding T21 collaboratively. The second AC loop is defined by the fourth switch S1c, the first winding T22, and the low-voltage side capacitor C2 collaboratively. When the first switch S1a and the fourth switch S1c are in the on state, at least one of the AC loops includes at least one part of the high-voltage side circuit 20 and the low-voltage side circuit 21. That is, the AC current flowing through each first winding flows through both of the high-voltage side circuit 20 and the low-voltage side circuit 21.

When the second switch S1b and the third switch S2c are in the on state, the power conversion circuit 1D has two AC loops. The first AC loop is defined by the third switch S2c, the first flying capacitor Cr1, the second switch S1b, the first winding T22, and the low-voltage side capacitor C2 collaboratively. The second AC loop is defined by the third switch S2c, the first winding T21, and the low-voltage side capacitor C2 collaboratively. When the second switch S1b and the third switch S2c are in the on state, at least one of the AC loops includes at least one part of the high-voltage side circuit 20 and the low-voltage side circuit 21. That is, the AC current flowing through each first winding flows through both of the high-voltage side circuit 20 and the low-voltage side circuit 21.

Figure 10:
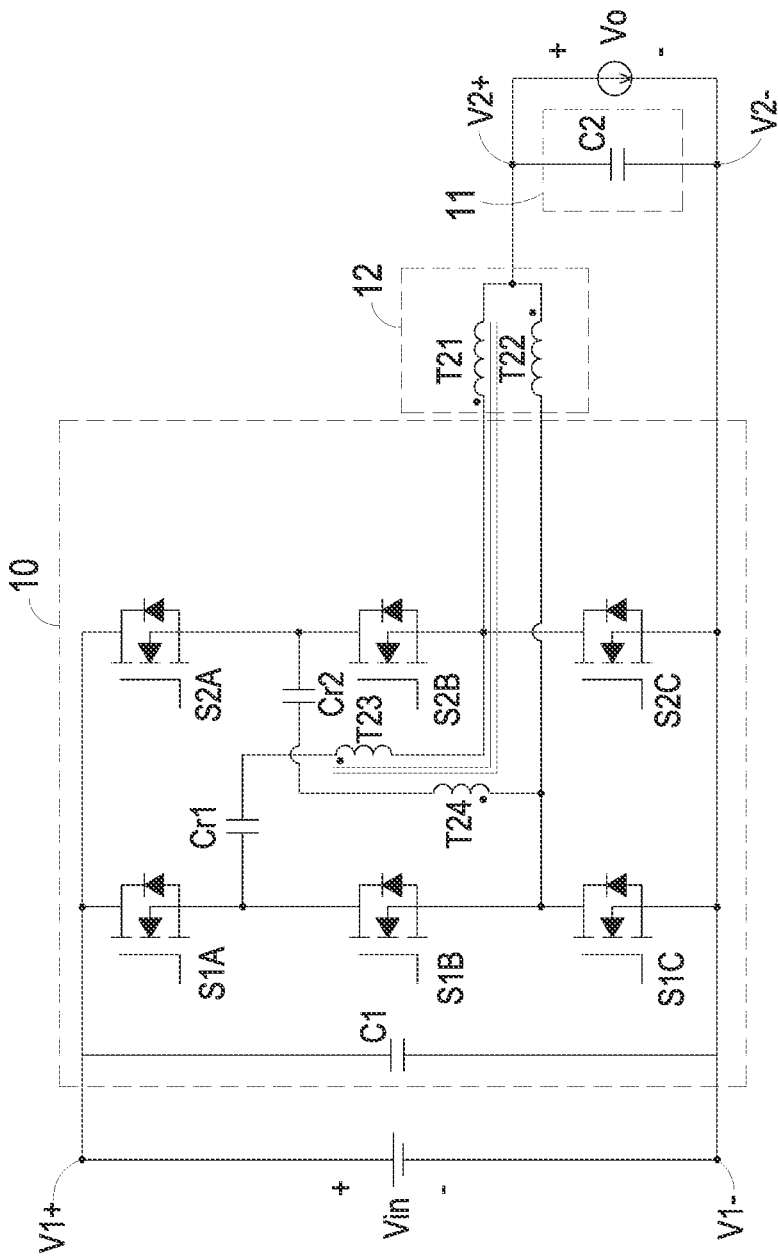
FIG. 10 is a schematic circuit diagram illustrating a fifth exemplary power conversion circuit of an embodiment of the present disclosure.

FIG. 10 is a schematic circuit diagram illustrating a fifth exemplary power conversion circuit of an embodiment of the present disclosure. In comparison with the power conversion circuit of FIG. 2A, the magnetic element 12 of the power conversion circuit 1F of this embodiment further includes two second windings T23 and T24. The second winding T23 and the first flying capacitor Cr1 are serially connected between the second terminal of the first switch S1A and the first terminal of the third switch S2C. The second winding T24 and the second flying capacitor Cr2 are serially connected between the first terminal of the sixth switch S1C and the second terminal of the fourth switch S2A. The turn ratio of each second winding to each first winding is N:1, wherein N is a positive integer. The operating principles, waveforms and AC loops of the power conversion circuit 1F are similar to those of FIG. 2A. That is, the AC current flowing through each first winding of the magnetic element 12 flows through both of the high-voltage side circuit 10 and the low-voltage side circuit 11. In a variant example, the second terminal of the high-voltage side capacitor C1 is electrically connected with the low-voltage positive terminal V2+. The operating principles, waveforms and AC loops of the power conversion circuit are similar to those of FIG. 7. That is, the AC current flowing through each first winding of the magnetic element 12 flows through both of the high-voltage side circuit 10 and the low-voltage side circuit 11.

Figure 11:
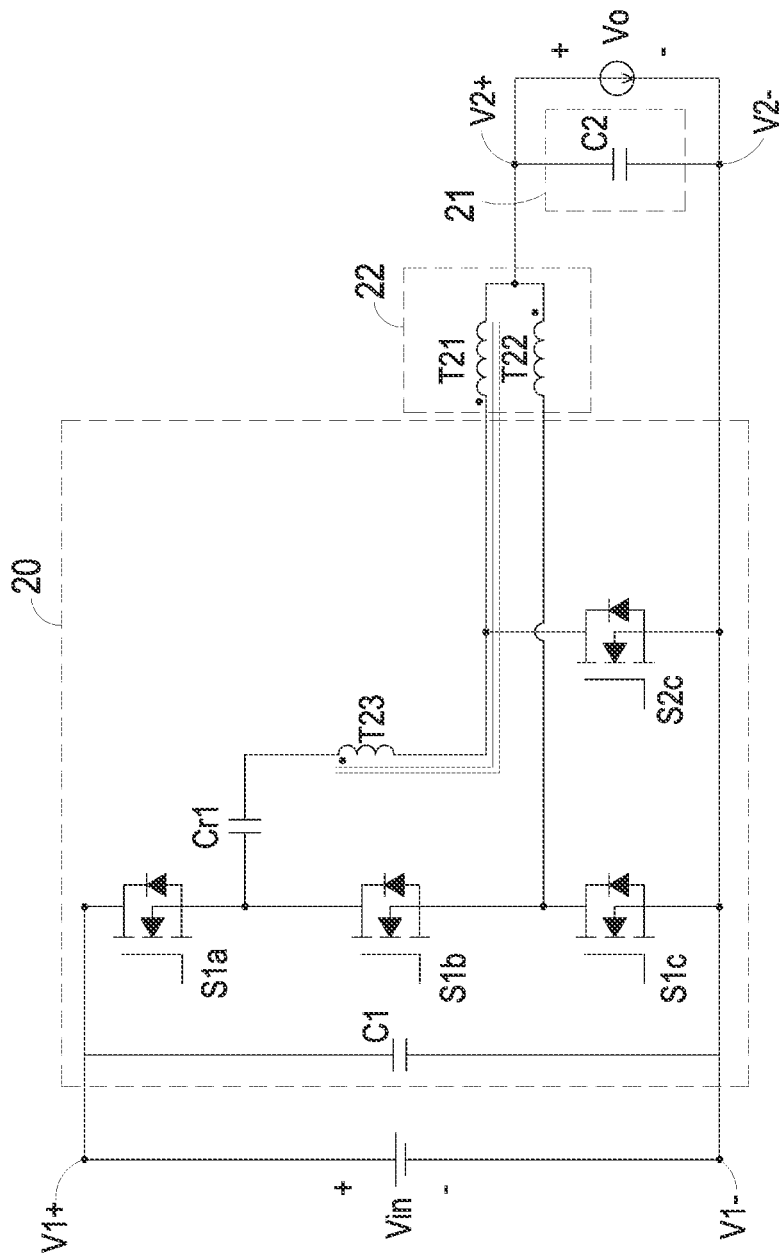
FIG. 11 is a schematic circuit diagram illustrating a sixth exemplary power conversion circuit of an embodiment of the present disclosure.

FIG. 11 is a schematic circuit diagram illustrating a sixth exemplary power conversion circuit of an embodiment of the present disclosure. In comparison with the power conversion circuit of FIG. 8, the magnetic element 12 of the power conversion circuit 1G of this embodiment further includes a second winding T23. The second winding T23 and the first flying capacitor Cr1 are serially connected between the second terminal of the first switch S1A and the first terminal of the third switch S2C. The turn ratio of the second winding to each first winding is N:1, wherein N is a positive integer. The operating principles, waveforms and AC loops of the power conversion circuit are similar to those of FIG. 8. That is, the AC current flowing through each first winding of the magnetic element 12 flows through both of the high-voltage side circuit 10 and the low-voltage side circuit 11. In a variant example, the second terminal of the high-voltage side capacitor C1 is electrically connected with the low-voltage positive terminal V2+. The operating principles, waveforms and AC loops of the power conversion circuit are similar to those of FIG. 9. That is, the AC current flowing through each first winding of the magnetic element 12 flows through both of the high-voltage side circuit 10 and the low-voltage side circuit 11.

In some embodiments, the magnetic element as shown in FIG. 2A or FIG. 8 is a coupling inductor. The coupling inductor includes two first windings. The connecting relationships of the two first windings and the associated components are similar to those as shown in FIG. 2A or FIG. 8. That is, the AC current flowing through each first winding of the magnetic element flows through both of the high-voltage side circuit and the low-voltage side circuit.

The power conversion circuit 1G can be applied to the power conversion module with any of the above layout structures. Consequently, the AC loss of the power conversion circuit is decreased, and the size of the power conversion module is reduced.

From the above descriptions, the embodiments of present disclosure provide the power conversion modules. The high-voltage side circuit and the low-voltage side circuit are located at the same side with respect to the magnetic element. That is, the plural AC currents flowing through the high-voltage side circuit and the low-voltage side circuit are located at the same side with respect to the magnetic element. Since the plural AC loops are not located at the two opposite sides of the magnetic element, the path length of each AC loop is reduced, and the AC loss of the power conversion circuit is decreased. Since the electronic components are closely arranged, the size of the power conversion module is reduced.

While the disclosure has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power conversion module, comprising:
   a first end comprising a high-voltage positive terminal and a high-voltage negative terminal;
   a second end comprising a low-voltage positive terminal and a low-voltage negative terminal, wherein the low-voltage negative terminal is electrically connected with the high-voltage negative terminal;
   a magnetic element comprising two first windings;
   a high-voltage side circuit electrically connected with the high-voltage positive terminal and the high-voltage negative terminal, and electrically connected with the two first windings of the magnetic element; and
   a low-voltage side circuit electrically connected with the low-voltage positive terminal and the low-voltage negative terminal, and electrically connected with the two first windings of the magnetic element,
   wherein the power conversion module comprises at least one alternating current (AC) loop defined by at least one of the first windings, at least one part of the high-voltage side circuit, and at least one part of the low-voltage side circuit, wherein the high-voltage side circuit and the low-voltage side circuit are located at a same side with respect to the magnetic element.

2. The power conversion module according to claim 1, wherein the low-voltage side circuit comprises a low-voltage side capacitor, wherein a first terminal of the low-voltage side capacitor is electrically connected with the low-voltage positive terminal, a second terminal of the low-voltage side capacitor is electrically connected with the low-voltage negative terminal, and a voltage ripple in a low-voltage side is filtered off by the low-voltage side capacitor.

3. The power conversion module according to claim 2, wherein the high-voltage side circuit comprises:
a high-voltage side capacitor, wherein a first terminal of the high-voltage side capacitor is electrically connected with the high-voltage positive terminal, and a second terminal of the high-voltage side capacitor is electrically connected with the high-voltage negative terminal or the low-voltage positive terminal;
a first switch group comprising a first switch and a third switch, which are electrically connected with each other;
a second switch group comprising a fifth switch and a sixth switch, which are electrically connected with each other, wherein a first terminal of the first switch is electrically connected with the high-voltage positive terminal, a second terminal of the first switch is electrically connected with a first terminal of the fifth switch, a second terminal of the third switch and a second terminal of the sixth switch are electrically connected with the high-voltage negative terminal, and a first terminal of the sixth switch is electrically connected with a second terminal of the fifth switch; and
a first flying capacitor, wherein a first terminal of the first flying capacitor is electrically connected with the second terminal of the first switch and the first terminal of the fifth switch, and a second terminal of the first flying capacitor is electrically connected with a first terminal of the third switch.

4. The power conversion module according to claim 3, wherein a first terminal of a first one of the two first windings is electrically connected with the first terminal of the third switch, a second terminal of the first one of the two first windings is electrically connected with the low-voltage positive terminal, a first terminal of a second one of the two first windings is electrically connected with the first terminal of the sixth switch, a second terminal of the second one of the two first windings is electrically connected with the low-voltage positive terminal, and second terminals of the two first windings are opposite-polarity terminals.

5. The power conversion module according to claim 3, wherein at least one of the sixth switch, the third switch and the low-voltage side capacitor is located adjacent to a side of the magnetic element.

6. The power conversion module according to claim 5, wherein the sixth switch, the third switch and the low-voltage side capacitor are sequentially arranged in a first row and located adjacent to the side of the magnetic element.

7. The power conversion module according to claim 3, further comprising a second winding, wherein the second winding and the first flying capacitor are serially connected between the second terminal of the first switch and the first terminal of the third switch.

8. The power conversion module according to claim 7, wherein the second winding is a planar winding.

9. The power conversion module according to claim 3, wherein the first switch group further comprises a second switch, the second switch group further comprises a fourth switch, and the power conversion module further comprises a second flying capacitor, wherein a second terminal of the second switch is electrically connected with the first terminal of the third switch, a first terminal of the fourth switch is electrically connected with the high-voltage positive terminal, a second terminal of the fourth switch is electrically connected with a first terminal of the second switch, a first terminal of the second flying capacitor is electrically connected with the second terminal of the fourth switch, and a second terminal of the second flying capacitor is electrically connected with the second terminal of the fifth switch and the first terminal of the sixth switch.

10. The power conversion module according to claim 9, further comprising two second windings, wherein a first one of the two second windings and the first flying capacitor are serially connected between the second terminal of the first switch and the first terminal of the third switch, and a second one of the two second windings and the second flying capacitor are serially connected between the first terminal of the sixth switch and the second terminal of the fourth switch.

11. The power conversion module according to claim 10, wherein the two second windings are planar windings.

12. The power conversion module according to claim 9, wherein the sixth switch, the third switch, and the low-voltage side capacitor are sequentially arranged in a first row and located adjacent to the side of the magnetic element, the fifth switch, the second flying capacitor, and the second switch are sequentially arranged in a second row, and the first switch, the first flying capacitor, and the fourth switch are sequentially arranged in a third row, wherein the first row, the second row, and the third row are in parallel with each other, and the second row is arranged between the first row and the third row, wherein the high-voltage side capacitor is located beside a first end of the first row, a first end of the second row and a first end of the third row and located adjacent to the first switch, the fifth switch and the sixth switch, or the high-voltage side capacitor is located beside a second end of the first row, a second end of the second row and a second end of the third row and located adjacent to the fourth switch, the second switch and the third switch.

13. The power conversion module according to claim 9, wherein the sixth switch, the third switch, and the low-voltage side capacitor are sequentially arranged in a first row and located adjacent to the side of the magnetic element, the first flying capacitor, the fifth switch, and the second flying capacitor are sequentially arranged in a second row, and the first switch, the second switch, and the fourth switch are sequentially arranged in a third row, wherein the first row, the second row, and the third row are in parallel with each other, and the second row is arranged between the first row and the third row, wherein the high-voltage side capacitor is located beside a first end of the first row, a first end of the second row, and a first end of the third row and located adjacent to the first switch, the first flying capacitor, and the sixth switch, or the high-voltage side capacitor is located beside a second end of the first row, a second end of the second row, and a second end of the third row and located adjacent to the fourth switch, the second flying capacitor, and the third switch.

14. The power conversion module according to claim 3, wherein the two first windings are planar windings.

15. The power conversion module according to claim 14, wherein a projection area of the third switch with respect to the first one of the two first windings is partially overlapped with the first one of the two first windings, and a projection area of the sixth switch with respect to the second one of the two first windings is partially overlapped with the second one of the two first windings.

16. The power conversion module according to claim 14, wherein projection areas of the two first windings with respect to a horizontal plane are at least partially overlapped with each other.

17. The power conversion module according to claim 14, wherein a projection overlap between the two first windings with respect to a horizontal plane is larger than 80%.

* * * * *